INVENTOR.
JAMES S. HOWARD
BY Edwin Grant
ATTORNEY

INVENTOR.
JAMES S. HOWARD

BY

Edwin Grant
ATTORNEY

United States Patent Office 3,577,297
Patented May 4, 1971

3,577,297
TAPING APPARATUS AND METHOD
James S. Howard, Riverside, Calif., assignor to Rohr Corporation, San Diego, Calif.
Filed Jan. 27, 1969, Ser. No. 794,107
Int. Cl. B32b 31/10, 31/18
U.S. Cl. 156—265                6 Claims

ABSTRACT OF THE DISCLOSURE

Apparatus for, and method of, laying strips of tape on a surface in adjacently disposed relation from two sides thereof, by means of the arrangement of two tape feeding and two tape cutting mechanisms on opposite sides of a pressure roller carried by a support head which is adapted to move in opposite directions along parallel paths on said surface.

BACKGROUND OF THE INVENTION

The invention disclosed herein relates to both an apparatus and a method for laying strips upon a surface, and more particularly to an apparatus and a method which are adapted for laying precisely spaced, parallel strips upon a surface from two sides thereof.

In the fabrication of laminated plastic structural members such as those used in aircraft, it is often necessary to apply strips of resin-impregnated fiberglass tape upon surfaces in contiguous, side-by-side relation. After such tape has been so laid it is subjected to heat and pressure to bond together adjacent edges of the tape and, since the tape is generally applied in multiple layers, to bond such layers together. If components such as honeycomb cores are to be bonded to the surface of the laminate thus formed, overlapping of the edges of the parallel strips cannot be permitted since this will result in the formation of ridges on the surface of the laminate which prevent proper bonding of said components to said surface. Furthermore, if the edges of the parallel strips are not spaced close to each other they will not be bonded together when heat and pressure are applied to the strips during the aforesaid bonding operation. Obviously the strips of fiberglass tape must also be laid down without wrinkles and preferably under a uniform pressure. The above and other requirements thus make it impracticable, from the standpoint of time and cost, to fabricate laminated plastic structural members manually.

SUMMARY OF THE INVENTION

As described in detail hereinafter, apparatus constructed in accordance with the principles of this invention comprises means for moving a pressure roller in opposite directions along parallel paths on a surface, means for feeding tape between said surface and said pressure roller alternately from opposite sides of the latter, and means for cutting said tape at opposite ends of said paths. More particularly, a preferred apparatus embodiment of the invention is provided with an elongated bed consisting of a pair of horizontally disposed ways, and a carriage slidably mounted on said ways and movable in opposite directions therealong by means of a rack and pinion arrangement. A horizontally disposed beam is slidably mounted on the aforesaid carriage for movement along its own longitudinal axis in a direction perpendicular to the ways of said bed, said beam also being driven by a rack and pinion mechanism. Pivotally mounted on one end of this beam for rotation about a vertical axis is a support head which can be locked at different angles relative to the longitudinal axis of the beam. A pneumatic cylinder is vertically positioned on the support head, and a pressure roller having a resilient rim is attached to the free end of the extensible shaft of said cylinder. The support head also carries a pair of tape feeding assemblies respectively positioned on opposite sides of the aforementioned pressure roller and adapted to feed tape between the latter and the surface on which strips are to be laid, as well as pair of tape cutting assemblies arranged for cutting the tapes fed from said tape feeding assemblies to the pressure roller.

To lay strips of tape on a surface in adjacently disposed relation by means of the above described apparatus, a first tape is fed under the aforesaid pressure roller from one of the tape feeding assemblies and the pressure roller is then moved downward by means of the attached pneumatic cylinder to press said tape against the surface on which it is to be laid. The support head on which the pressure roller is mounted is then moved in a first direction lengthwise of said first tape as the latter is fed between said pressure roller and said surface from the tape feeding assembly. Just before the pressure roller reaches the end of the path along which tape is laid, the first tape is cut at a point ahead of said pressure roller and the latter continues to roll in the same direction until it has pressed the end of the first tape against the surface. The support head is then stopped, the pneumatic cylinder is actuated to lift the attached pressure roller away from the surface being taped, and the support head is then moved a predetermined distance laterally of said first tape. A second tape is next fed under the pressure roller from the other tape feeding assembly mounted on the support head, the pressure roller is moved downward by means of the pneumatic cylinder to press this second tape against the surface, and the support head is moved in a second direction lengthwise of said second tape as the latter is fed to the pressure roller, said second direction of motion of the pressure roller being opposite to its first direction along the surface during the laying of the first tape referred to herein. Just before the pressure roller reaches the end of its second path along the surface, the second tape is cut at a point ahead of said pressure roller and the latter continues to roll in the same direction until it has pressed the end of the second tape against the surface. The pressure roller is again lifted from the surface and shifted laterally of the second tape, after which the foregoing steps are repeated until the surface is covered with adjacently disposed strips as desired.

OBJECTS OF THE INVENTION

Accordingly, it is an object of this invention to provide an effective means and an efficient method for laying strips of tape upon a surface in adjacently disposed relation.

Another object of the invention is to provide apparatus capable of laying parallel strips upon a surface in opposite directions.

Still another object of the invention is to provide a method of rapidly laying strips upon a surface in adjacently disposed relation.

A further object of the invention is to provide apparatus which can place layers of adjacently disposed strips upon a surface at different angles relative to one another.

BRIEF DESCRIPTION OF THE DRAWINGS

In the accompanying drawings.

Throughout the drawings and the following specification like numbers designate like parts.

DETAILED DESCRIPTION

Figure 1:
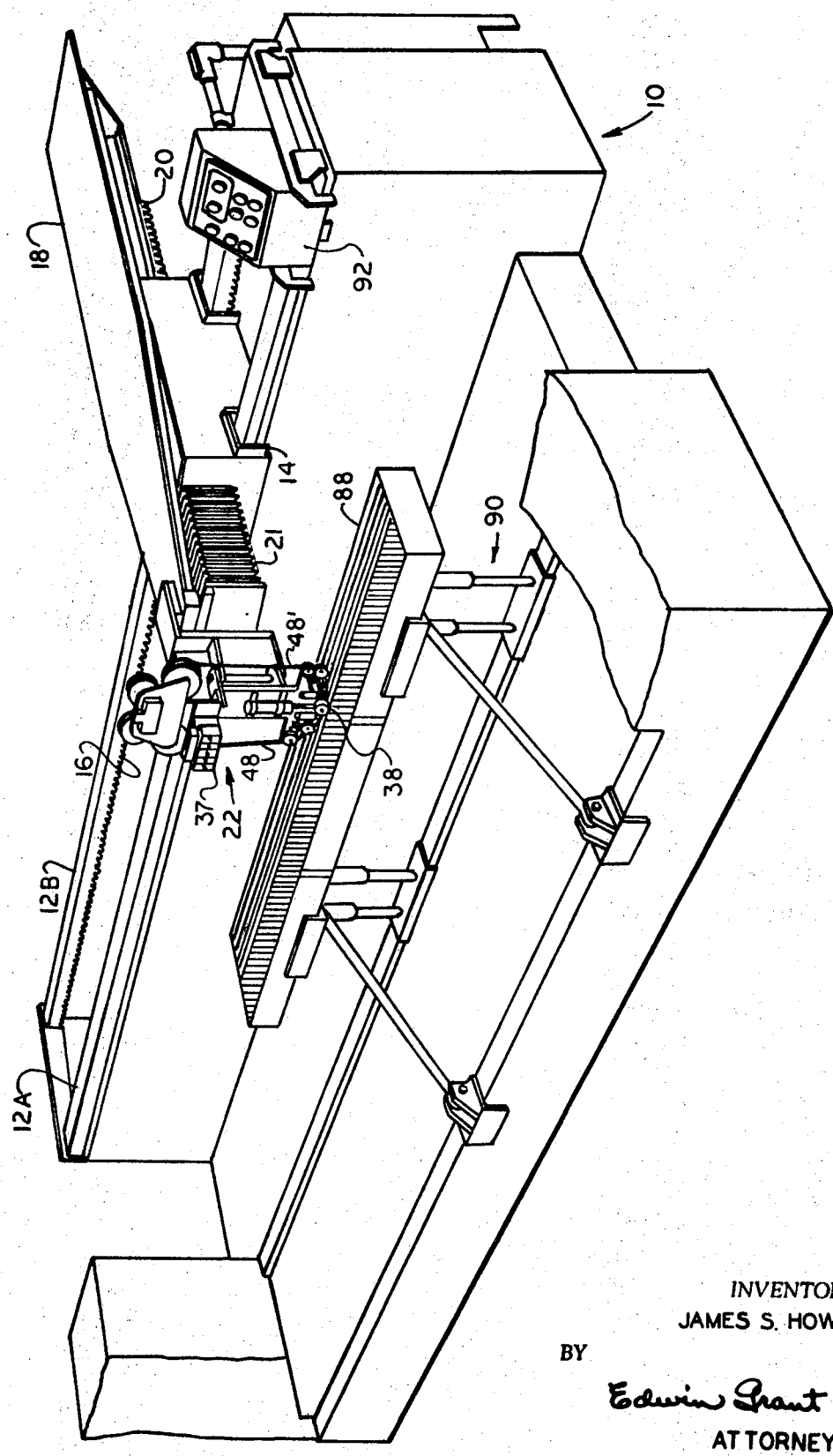
FIG. 1 is a pictorial view illustrating a preferred embodiment of the invention.

As illustrated in FIG. 1, a preferred apparatus embodiment of this invention comprises an elongated bed which is generally designated in the drawing by the number 10 and which is provided with a pair of parallel ways 12A, 12B on which a carriage 14 is slidably supported. Carriage 14 is driven in opposite directions along bed 10 by means of a pinion (not shown) carried by said carriage and engaged with a rack 16 attached to said bed. Slidably mounted on carriage 14 for movement along its own longitudinal axis is a beam 18, a second pinion (not shown) being carried by said carriage and engaged with a rack 20 attached to said beam to move the latter in opposite directions along said longitudinal axis thereof. The front, lower portions of beam 18 and rack 20 are covered with an extensible bellows 21.

Figure 2:
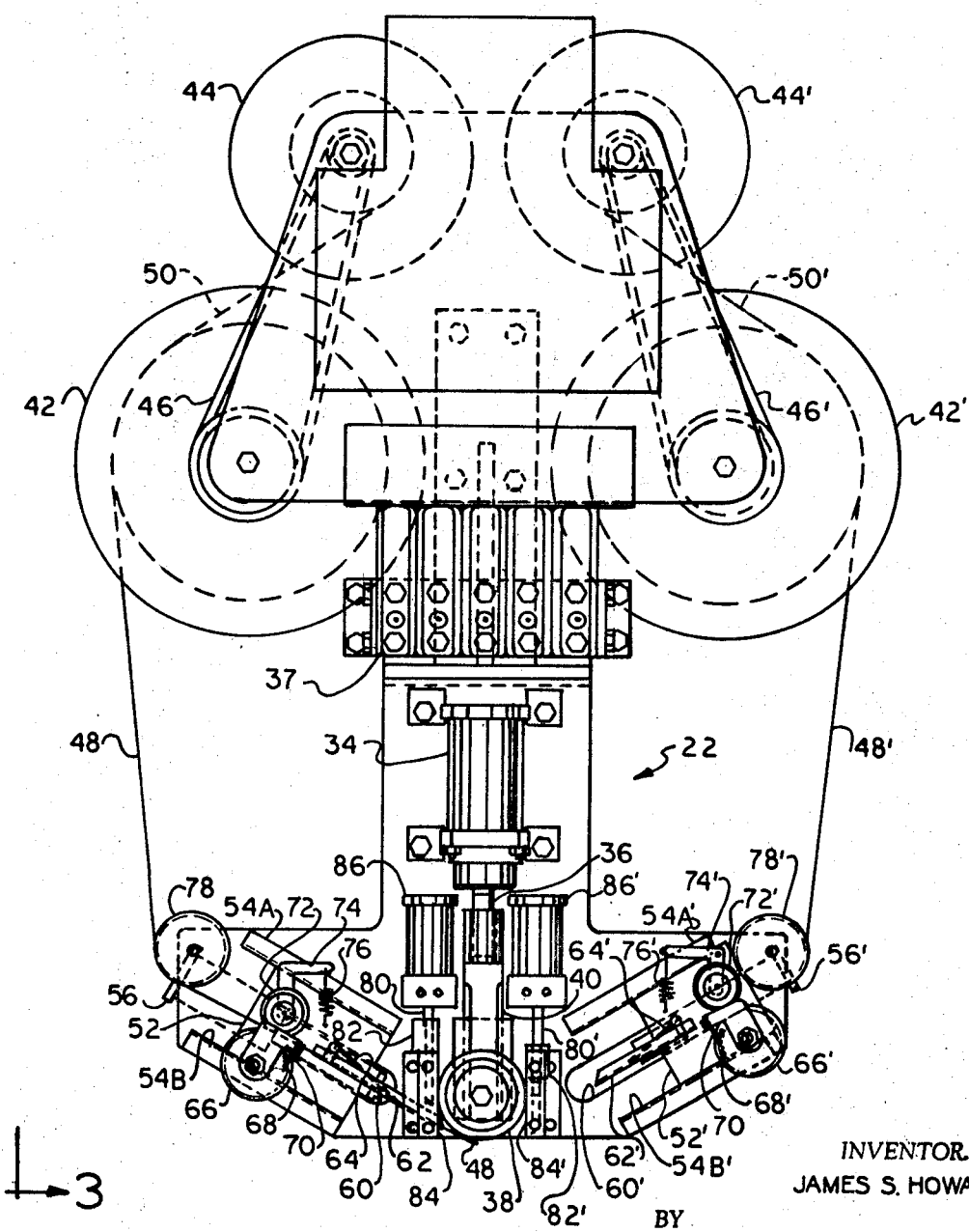
FIG. 2 is a front elevation of certain components of the apparatus depicted in FIG. 1.
Figure 3:
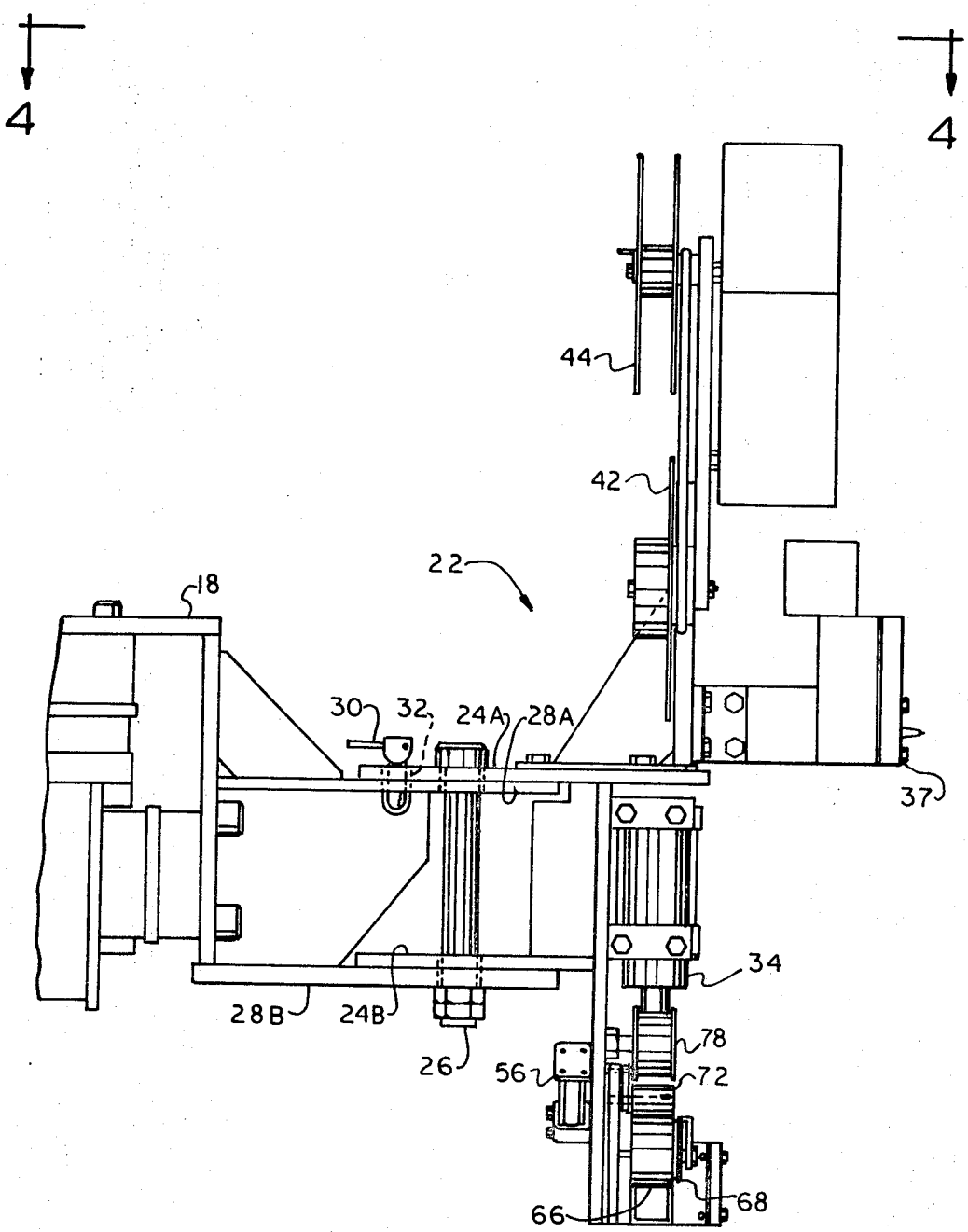
FIG. 3 is a side elevation of the same components, taken along the plane represented by the line designated 3—3 in FIG. 2 and in the direction indicated therein.

A support head, generally designated in FIGS. 1–5 by the number 22, is mounted on the front end of beam 18 for rotation about an axis disposed perpendicular to the longitudinal axes of said beam and bed 10 (i.e., for rotation about a vertical axis in the normal arrangement of the apparatus). More particualrly, as illustrated in FIG. 3 support head 22 comprises a pair of support arms 24A, 24B which are pivotally connected by means of a bolt 26 to two horizontally disposed plates 28A, 28B fixedly attached at one end thereof to the end of beam 18, and a locking pin 30 is mounted on support arm 24A and engaged within one of a plurality of holes 32 (see FIG. 4) formed in plate 28A to thereby lock said support head at a selected angular position relative to the longitudinal axis of said beam.

As can best be seen in FIG. 2, support head 22 carries a roller support and drive assembly comprising a vertically disposed pneumatic pressure cylinder 34, a piston (not shown) slidably disposed within said cylinder, a drive shaft 36 which is formed of two threadedly engaged sections and one end of which is connected to said piston, and a pressure roller 38 which preferably has a resilient rim and which is mounted on the free end of said drive shaft for rotation about a horizontally disposed axis. The axis of rotation of pressure roller 38 is maintained in fixed position relative to support head 22 by means of a guide member 40 which is attached to said support head and which engages a flat portion of drive shaft 36. Conventional pressurizing means (a portion of which is designated in the drawings by the number 37) are connected to cylinders 34 to selectively drive the aforesaid piston in opposite directions therein and thus move pressure roller 38 between a first position thereof which is illustrated in FIG. 2 and a second lower position thereof which is illustreatd in FIG. 5.

Also shown in FIG. 2 are first and second tape feeding assemblies each of which comprises a tape supply drum 42, 42' rotatably muonted on support head 22, and a spool 44, 44' which is also rotatably mounted on said support head and the rotation of which is synchronized with the motion of said tape supply drum by means of a belt 46, 46' engaged with pulleys attached to said drum and spool. First and second tapes 48, 48' are respectively wound on drums 42, 42', one surface of each of said tapes being coated with an adhesive and covered by a tape 50, 50' which is peeled from said surface and wound on a respective one of the spools 44, 44' as the associated tape 48 is unwound from its drum 42. Each of the tape feeding assemblies also comprises a flat slide member 52, 52' which is slidably mounted between two parallel slide plates 54A, 54B, 54A', 54B' fixedly attached to the front side of support head 22, said slide members 52 being movable between a first position remote from pressure roller 38 (the support member 52' being illustrated in this first position in FIG. 2) and a second position adjacent said pressure roller (the support member 52 being illustrated in this second position in FIG. 2). To drive the aforesaid slide members 52 between said first and second positions thereof, the apparatus is provided with pneumatic pressure cylinders 56, 56' which are fixedly attached to the rear side of support head 22, pistons (not shown) slidably disposed within said cylinders, drive shafts 58, 58' (represented by broken lines in FIG. 5) one end of each of which is connected to a respective one of said pistons and the other end of which is connected to the associated slide member 52 through a slot 60, 60' formed in support head 22, and conventional pressurizing means (a portion of which is designated in the drawings by the number 37) connected to cylinders 56 and adapted to drive the aforesaid pistons in opposite directions therein. Each slide member 52 carries an elongate tape guide member 62, 62' in the form of a trough the width of which is substantially equal to the width of tape 48 and one end of which is positioned adjacent the lower periphery of pressure roller 38 when said slide member and pressure roller are in the aforesiad second positions thereof. Spring biased arms 64, 64' hold first and second tapes 48, 48' against respective ones of said tape guide members.

Each of the aforedescribed first and second tape feeding assemblies is also provided with a tape feed control mechanism comprising a first feed roller 66, 66' rotatably mounted on the associated slide member 52, a ratchet wheel 68, 68' fixedly attached to said first feed roller, a pawl 70, 70' which engages said ratchet wheel and allows said first feed roller to turn in one direction only (which direction is clockwise in the case of said first feed roller 66 is the view of the latter shown in FIG. 2, and counterclockwise in the case of said first feed roller 66' in the view of the latter shown in the same drawing), and a second feed roller 72, 72' rotatably mounted on one end of an L-shaped arm 74, 74' which is in turn pivotally mounted on slide member 52 and biased by means of a spring 76, 76' so as to move said second feed roller toward the associated first feed roller. An idler roller 78, 78' is rotatably mounted on support head 22 adjacent each of said first and second tape feeding assemblies to align a respective one of said first and second tapes 48, 48' with the associated tape guide members 62, 62'. During the operation of the described apparatus, each of the tapes 48 extends from its drum 42 to an idler roller 78 and thence between a pair of the rollers 66, 72 to a respective one of the tape guide members 62.

Figure 5:
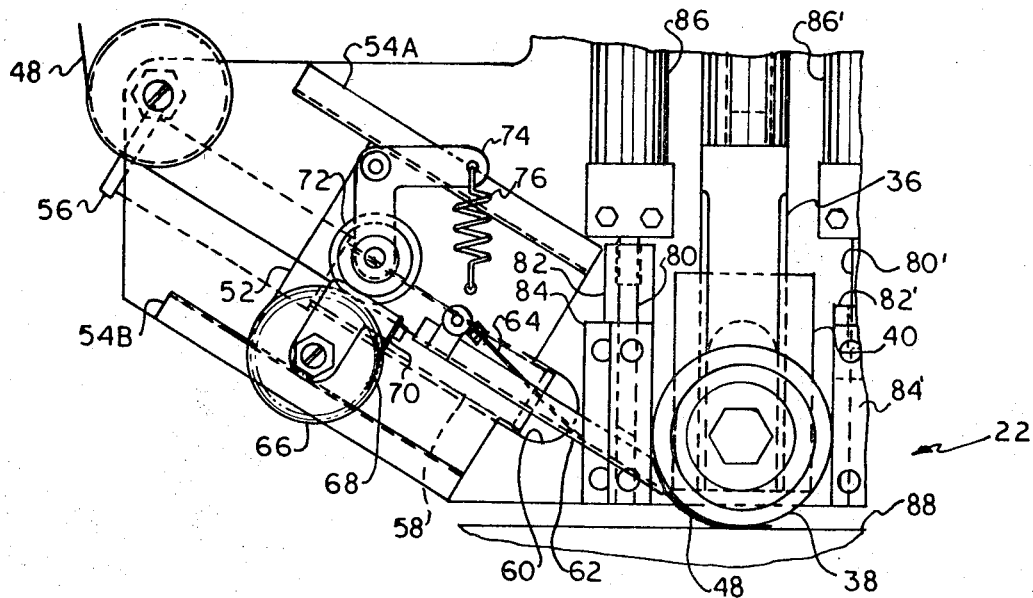
FIG. 5 is detail view of some of the components depicted in FIG. 2.
Figure 4:
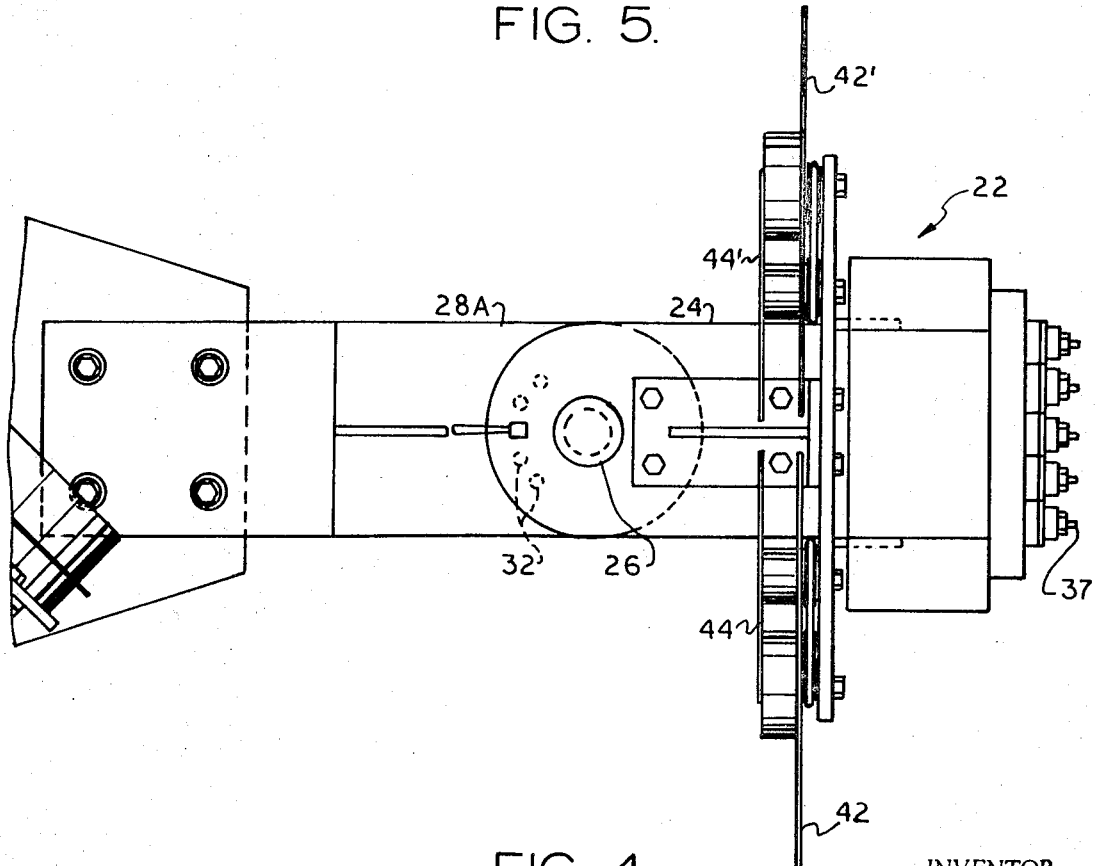
FIG. 4 is a plan view of the same components, taken along the plane represented by the line designated 4—4 in FIG. 3 and in the direction indicated therein.

FIGS. 2 and 5 illustrate first and second tape cutting assemblies respectively positioned on opposite sides of pressure roller 38 and each comprising a vertically disposed bar 80, 80' having a cutting edge at the lower end thereof. More particularly, each of said bars has a block 82, 82' fixedly positioned thereon, and this block slidably engages a guide member 84, 84' which is mounted on support head 22. It should be noted at this point that each of the guide members 84, 84' has a slot extending therethrough, the end of a respective one of said tape guide members 62, 62' passing through this slot when its associated slide member 52, 52' is in the aforesaid second position thereof. Each bar 80, 80' is movable between a first position wherein its cutting edge is positioned above the line of travel of the tape 48 from the adjacent guide member 62 to pressure roller 38 (the bar 80 being illustrated in this first position in FIG. 2) and a second position wherein its cutting edge is positioned below the line of travel of said tape (the bar 80' being illustrated in this second position in FIG. 2). Each tape cutting assembly also comprises a pneumatic pressure cylinder 86, 86' mounted on support head 22, a piston (not shown) slidably disposed within said cylinder and connected to the upper end of bar 80, and conventional pressurizing means (a portion of which is designated in the drawings by the number 37) connected to said cylinder and adapted to drive said piston in opposite directions within said cylinder to thereby move said bar between said first and second positions thereof.

In FIG. 1 is illustrated a box beam, hereinafter referred to as workpiece 88, having a plane upper surface upon which strips of tape can be laid in adjacently disposed relation by means of the above described apparatus embodiment of this invention. Workpiece 88 is supported upon a worktable generally designated by the number 90. Also illustrated in the same drawing is a control console 92 constituting a portion of a numerical control system which is programmed to move carriage 14, beam 18, and other moving parts of the apparatus during process steps in accordance with the invention, as disclosed hereinafter. Since the principles of numerical control of machines are well-known in the art and do not constitute a part of the present invention, details of the electrical equipment used to control the disclosed apparatus are omitted.

OPERATION

By means of the illustrated apparatus adhesive-coated tape can be laid on workpiece 88 in precisely spaced, parallel strips which extend in any desired direction relative to the longitudinal axis of said workpiece. For example, to lay strips on workpiece 88 at an angle of 45 degrees relative to the longitudinal axis thereof, carriage 14 and beam 18 can be moved to position pressure roller 38 adjacent one edge of said workpiece, with said pressure roller being in the aforesaid first position thereof (and thus spaced from the upper surface of the workpiece) and with support head 22 locked at an angle of 45 degrees with respect to the longitudinal axis of said beam. (For the purpose of illustration it will be assumed that pressure roller 38 is initially positioned above the edge of workpiece 88 which is rearmost in FIG. 1 and strips of tape are to be laid starting from a point adjacent the end of the workpiece which is on the right in the same drawing.) Tape 48 is next fed under pressure roller 38 by actuating cylinder 56 so to drive slide member 52 downward and bring the end of tape guide member 62 close to the lower periphery of said pressure roller as illustrated in FIG. 5. It should be noted at this point that tape 48, being held against guide member 62 by means of arm 64, is unwound from drum 42 (see FIG. 2) as slide member 52 is moved toward pressure roller 38, and also that tape 48 is initially extended beyond the end of said guide member so that it lies under said pressure roller when slide member 52 is in the aforesaid second position thereof. As previously mentioned, tape 50 is peeled from tape 48 and wound on spool 44 as said tape 48 is unwound from drum 42. Cylinder 34 is next actuated to move pressure roller 38 downward, thereby pressing the adhesive-coated side of tape 48 against the upper surface of workpiece 88. A selected constant pressure is maintained in cylinder 34 when pressure roller 38 is in contact with tape 48 and the latter is against workpiece 88. Carriage 14 is then moved toward the end of bed 10 which is on the left in FIG. 1 as beam 18 is moved at the same rate in a forward direction on said carriage (i.e., to the left in FIG. 1), thereby moving pressure roller 38 in a first direction across workpiece 88 at an angle of 45 degrees with respect to the longitudinal axis thereof. The motion of pressure roller 38 is lengthwise of tape 48, which is pulled from drum 42 as said pressure roller rolls toward the forward edge of workpiece 88 and presses said tape against the upper surface of said workpiece. When the pressure roller is a short distance from the forward edge of the workpiece, cylinder 56 is actuated to drive slide member 52 away from pressure roller 38 and immediately thereafter cylinder 86 is actuated to move bar 80 downward and thereby cut tape 48 at a point just ahead of said pressure roller, the motion of the latter not being stopped until the end of the cut strip of tape has been pressed against workpiece 88 at said forward edge thereof. Cylinder 34 is then actuated to lift pressure roller 38 upward, and carriage 14 is moved toward the left end of bed 10 (beam 18 meanwhile being held in the position it was in when the pressure roller reached the end of tape 48). This last mentioned movement of carriage 14 is such that one edge of the next strip of tape laid down by the apparatus, which as will be seen is fed to pressure roller 38 from the tape feeding assembly on the opposite side thereof, will be substantially coincident with one edge of the first strip of tape applied to the surface of workpiece 88.

After pressure roller 38 has been moved laterally of the first strip of tape placed on workpiece 88 as aforesaid, cylinder 56' is actuated to drive slide member 52' downward and bring the end of tape guide member 62' close to the lower periphery of said pressure roller (which position of said slide member 52' and its guide member 62' is not illustrated in the drawing). As in the case of tape 48, the tape 48' associated with the second tape feeding assembly is initially extended from the end of guide member 62' so that said tape lies under pressure roller 38. Cylinder 34 is next actuated to move the pressure roller downward and thereby press tape 48' against the upper surface of workpiece 88, the pressure in said cylinder thereafter being maintained at the same level which was employed to press tape 48 against said surface. Carriage 14 is then moved toward the end of bed 10 which is on the right in FIG. 1 as beam 18 is moved at the same rate toward the rear of said carriage, thereby moving pressure roller 38 in a second direction across workpiece 88 which is opposite to the aforesaid first direction of motion of said pressure roller across the workpiece and parallel thereto. Tape 48' is of course fed to pressure roller 38 from drum 42' as said pressure roller moves lengthwise of said tape and bonds it to workpiece 88. When the pressure roller is a short distance from the rear edge of the workpiece, cylinder 86' is actuated to move bar 80' downward and thereby cut tape 48' at a point just ahead of said pressure roller, which stops only after the ends of the strip is reached. Cylinder 34 is thereafter actuated to lift pressure roller 38 upward, and carriage 14 is again moved toward the left end of bed 10 to position the pressure roller for its next movement across workpiece 88. By proper adjustment of the travel of slide members 52, 52', tapes 48, 48' can be fed to pressure roller 38 so that the ends of the tapes will be directly under the pressure roller when the slide members are moved to the aforesaid second position thereof adjacent the pressure roller, and no manual adjustment of the length of the tape which extends beyond guide members 62, 62' will be necessary at the end of each movement of the pressure roller across workpiece 88. It will be obvious that the entire upper surface of the workpiece can be covered with adjacency disposed, parallel strips of the tapes 48, 48' by repetition of the aforedescribed process steps in accordance with the invention, and that such strips can also be laid longitudinally of the workpiece by proper programming of the motion of support head 22 and actions of its tape feeding and cutting assemblies.

It has been found that the disclosed apparatus and method provide the advantage of laying resin-impregnated, fiberglass tape in adjacent, parallel strips with uniform spacing and bonding pressure. Furthermore, the arrangement of the tape feeding and cutting assemblies of the preferred apparatus embodiment of the invention enables tape to be laid automatically in parallel strips with great rapidity. Since the motions of carriage 14 and beam 18 can be programmed as desired, the disclosed aparatus also provides convenient means for laying layers of parallel strips of tape upon a surface at different angles to one another. Among the smaller but important advantages of the preferred embodiment of the invention is that provided by the arrangement of the two tape feed control assemblies (comprised of rollers 66, 66', ratchet wheels 68, 68', pawls 70, 70', and spring biased rollers 72, 72'), which serve to prevent tapes 48, 48' respectively from moving away from pressure roller 38 and thereby assist in the laying of said tapes in smooth, unwrinkled strips.

Although this invention has been described with reference to a particular embodiment of same, it should not be limited thereto for various changes and modifications

What is claimed as new and useful and desired to be secured by Letters Patent is:

1. Apparatus for laying on a surface adjacently disposed strips, comprising:
    a pressure roller;
    means for moving the pressure roller in opposite directions along adjacent parallel paths on said surface;
    means for feeding tape between said surface and pressure roller alternately from opposite sides of the latter; and means for cutting said tape at opposite ends of said parallel paths after the laying of said tape on said surface.

2. Apparatus for laying on a surface adjacently disposed strips, comprising:
    a support head;
    means for moving said support head in opposite directions along adjacent parallel paths on said surface;
    a pressure roller and drive means attached to said support head and pressure roller and adapted for moving the latter toward and away from said surface;
    first and second tape feeding means mounted on said support head and adapted for feeding tape between said surface and said pressure roller alternately from opposite sides of the latter; and
    cutting means mounted on said support head and adapted for cutting said tape on both sides of said pressure roller.

3. Apparatus for laying on a surface adjacently disposed strips, comprising:
    a support head;
    means for moving said support head in opposite directions along parallel paths on said surface;
    a pressure roller support and drive assembly mounted on said support head and including drive means and a pressure roller carried by said drive means, said drive means being adapted to move said pressure roller between a first position remote from said surface and a second position adjacent thereto;
    first and second tape feeding assemblies respectively positioned on opposite sides of said pressure roller and each comprising a suport member mounted on said support head for movement between a first position remote from said pressure roller and a second position adjacent thereto, means on said support head for driving said support member between said first and second positions thereof, a guide member mounted on said support member and arranged so that when said pressure roller and said support member are in said second positions thereof one end of said guide member is positioned adjacent said surface and the lower periphery of said pressure roller;
    first and second tape feed control assemblies respectively mounted on said support members and each adapted to allow tape to move along the guide member of the support member associated therewith toward said pressure roller and to prevent said tape from moving in the oposite direction; and
    first and second tape cutting assemblies respectively positioned on opposite sides of said pressure roller and each comprising a blade mounted on said support head for movement between a first position remote from said surface and a second position adjacent said surface, and means on said support head for driving said blade between said first and second positions thereof, the line of travel of said blade intersecting the line of travel of tape from the adjacent one of said guide members to said pressure roller.

4. Apparatus as defined in claim 3 wherein each of said tape feed control means comprises a first feed roller mounted on said support member associated therewith, means attached to said support member and adapted to allow said first feed roller to turn in one direction only, a second feed roller mounted on said support member for movement toward and away from said first feed roller, and means attached to said support member for biasing said second feed roller toward said first feed roller.

5. Apparatus for laying strips on the surface of a workpiece in adjacently disposed relation, comprising:
    an elongated bed;
    a carriage mounted on said bed and movable therealong;
    means for driving said carriage in opposite directions along said bed;
    a beam slidably mounted on said carriage for movement along its own longitudinal axis in a direction perpendicular to the longitudinal axis of said bed;
    means for driving said beam in opposite directions along the longitudinal axis thereof;
    a support head mounted on one end of said beam for rotation about an axis disposed perpendicular to the longitudinal axis of said bed and beam;
    means for locking said support head at different angular positions relative to said beam;
    a worktable positioned adjacent said bed and adapted to support said workpiece;
    a pressure roller support and drive assembly mounted on said support head and including a drive motor, a drive shaft one end of which is connected to said drive motor, and a pressure roller mounted on the free end of said drive member, said drive motor and drive member being adapted to move said pressure roller between a first position remote from the upper surface of said workpiece supported on said worktable and a second position adjacent said upper surface;
    first and second tape feeding assemblies respectively positioned on opposite sides of said pressure roller and each comprising a support member mounted on said support head for movement between a first position remote from said pressure roller and a second position adjacent thereto, means on said support head for driving said support member between said first and second positions thereof, a tape guide member mounted on said support member and arranged so that when said pressure roller and said support member are in said second positions thereof one end of said tape guide member is positioned adjacent said upper surface of said workpiece supported on said worktable and the lower periphery of said pressure roller;
    first and second tape feed control assemblies respectively mounted on said support members and each comprising a first feed roller mounted on the support member associated therewith, means attached to said support member and adapted to allow said first feed roller to turn in one direction only, a second feed roller mounted on said support member for movement toward and away from said first feed roller, and means attached to said support member for biasing said second feed roller toward said first feed roller; and
    first and second tape cutting assemblies respectively positioned on opposite sides of said pressure roller and each comprising a blade mounted on said support head for movement between a first position remote from the upper surface of said workpiece and a second position adjacent thereto, and means on said support head for driving said blade between said first and second positions thereof, the line of travel of said blade intersecting the line of travel of tape from the adjacent one of said guide members to said pressure roller.

6. A method of laying on a surface adjacently disposed strips, comprising the steps of:
    feeding a first tape between said surface and a pressure roller from one side of the latter while moving said pressure roller in a first direction along said surface and exerting pressure against said first tape by means thereof;

cutting said first tape and continuing to move said pressure roller in said first direction until the end of the separated strip thereof has been pressed against said surface;

stopping said pressure roller and lifting it away from said surface, and then moving it laterally of the aforesaid strip of said first tape;

feeding a second tape between said surface and said pressure roller from the other side thereof while moving said pressure roller in a second direction along said surface opposite to said first direction and parallel thereto and exerting pressure against said second tape by means thereof;

cutting said second tape and continuing to move said pressure roller in said second direction until the end of the separated strip thereof has been pressed against said surface;

stopping said pressure roller and lifting it away from said surface, and then moving it laterally of the aforesaid strip of said second tape and repeating the preceding steps.

References Cited

UNITED STATES PATENTS

| | | | |
|---|---|---|---|
| 2,649,221 | 8/1953 | Wagner et al. | 156—468 |
| 2,941,576 | 6/1960 | Schenkengel | 156—582X |
| 3,206,911 | 9/1965 | Carle et al. | 156—522X |
| 3,334,550 | 8/1967 | Craig | 156—264X |
| 3,474,370 | 10/1969 | Lightner | 156—468X |
| 3,516,892 | 6/1970 | Becka et al. | 156—522 |

BENJAMIN A. BORCHELT, Primary Examiner

J. M. HANLEY, Assistant Examiner

U.S. Cl. X.R.

156—300, 486, 495, 512, 522